US012182920B2

(12) United States Patent
Kang

(10) Patent No.: US 12,182,920 B2
(45) Date of Patent: Dec. 31, 2024

(54) METHOD AND APPARATUS FOR GENERATING MOUTH SHAPE BY USING DEEP LEARNING NETWORK

(71) Applicant: KLLEON INC., Seoul (KR)

(72) Inventor: Ji-Su Kang, Seoul (KR)

(73) Assignee: KLLEON INC., Seoul (KR)

( * ) Notice: Subject to any disclaimer, the term of this patent is extended or adjusted under 35 U.S.C. 154(b) by 0 days.

(21) Appl. No.: 18/570,595

(22) PCT Filed: Oct. 25, 2022

(86) PCT No.: PCT/KR2022/016388

§ 371 (c)(1),
(2) Date: Apr. 15, 2024

(87) PCT Pub. No.: WO2023/075381

PCT Pub. Date: May 4, 2023

(65) Prior Publication Data

US 2024/0265606 A1 Aug. 8, 2024

(30) Foreign Application Priority Data

Oct. 25, 2021 (KR) ........................ 10-2021-0142877

(51) Int. Cl.
*G06T 13/20* (2011.01)
*G06T 13/40* (2011.01)
(Continued)

(52) U.S. Cl.
CPC ............ *G06T 13/205* (2013.01); *G06T 13/40* (2013.01); *G06V 40/169* (2022.01); *G10L 15/02* (2013.01)

(58) Field of Classification Search
None
See application file for complete search history.

(56) References Cited

U.S. PATENT DOCUMENTS

2007/0153089 A1* 7/2007 Cooper .............. H04N 21/2368 375/E7.271
2019/0392625 A1* 12/2019 Wang ........................ G06N 3/08
(Continued)

FOREIGN PATENT DOCUMENTS

KR 10-1998-0047008 A 9/1998
KR 10-2016-0098581 A 8/2016
(Continued)

OTHER PUBLICATIONS

Lingyun et al, "Multimodal Inputs Driven Talking Face Generation With Spatial-Temporal Dependency", IEEE, 2020, vol. 31, p. 1-15.
(Continued)

*Primary Examiner* — Yingchun He
(74) *Attorney, Agent, or Firm* — IDEA Intellectual Limited; Margaret A. Burke; Sam T. Yip

(57) ABSTRACT

The present invention relates to a method for generating a mouth shape by using a deep learning network, and comprises the steps of: receiving a face image as an input; generating a mouth shape of the face image into a preset mouth shape by using a first mouth shape generation preprocessing deep learning model; receiving speech information as an input; generating the preset mouth shape into a mouth shape synchronizing with the speech information by using a second mouth shape generation preprocessing deep learning model; and transforming the mouth shape synchronizing with the speech information into high definition by using a high definition transform postprocessing deep learning model.

4 Claims, 7 Drawing Sheets

(51) Int. Cl.
*G06V 40/16* (2022.01)
*G10L 15/02* (2006.01)

(56) References Cited

U.S. PATENT DOCUMENTS

2022/0351348 A1* 11/2022 Chae ...................... G06N 3/094
2024/0038238 A1* 2/2024 Qin ...................... G06V 10/806

FOREIGN PATENT DOCUMENTS

KR 10-1827168 B1 2/2018
KR 10-2019-0114150 A 10/2019
KR 10-2020-0013907 A 2/2020
KR 10-2020-0145700 A 12/2020
KR 10-2251781 B1 5/2021

OTHER PUBLICATIONS

International search report and written opinion of corresponding PCT application No. PCT/KR2022/016388 mailing on Jan. 27, 2023.
Notice of Allowance of corresponding KR application No. 10-2021-0142877 mailing on Sep. 14, 2022.

* cited by examiner

METHOD AND APPARATUS FOR GENERATING MOUTH SHAPE BY USING DEEP LEARNING NETWORK

TECHNICAL FIELD

The present disclosure relates to a method and an apparatus for generating a mouth shape synchronizing with speech by using a deep learning network. More particularly, the present disclosure relates to a method and an apparatus for generating images and videos in which a mouth shape changes according to speech by generating the mouth shape that is precisely in synchronization with the speech.

BACKGROUND

Various technologies are being developed to create facial videos so that the mouth moves in synchronization with speeches when facial images and the speeches are input into a device or software program. Here, technology for generating speech of a desired voice by using text-to-speech (TTS) technology is gaining attention. By creating a mouth shape that is in synchronization with speech generated through TTS, it is possible to create a video as if a person in the video is actually speaking in a desired voice.

The above-described prior art consists of an encoder that extracts appearance information from a face image, an encoder that extracts mouth shape information corresponding to speech from a speech, and a decoder that combines the two pieces of extracted information to generate an image. In addition, a pre-trained lip sync discrimination deep learning model was used to discriminate whether a mouth shape was in sync with speech in a generated video so that a mouth shape generation deep learning network could be effectively trained. Furthermore, generative adversarial neural networks (GANs) were used to induce the generation of more accurate mouth shapes.

However, in the method of generating a mouth shape by using a lip sync discrimination deep learning model, the mouth shape is generated on the basis of an initial mouth shape of an input face image, so the mouth shape is inaccurate and there is no standard for sync discrimination and the quality of the mouth shape is inevitably low as low-definition deep learning training is performed for the sake of learning stability.

SUMMARY OF THE INVENTION

Technical Problem

The present disclosure provides a method and an apparatus for generating a mouth shape that is in sync with speech by using a deep learning network.

The present disclosure provides a method and an apparatus for generating a mouth shape by using a mouth shape generation preprocessing deep learning model and a high-definition transform postprocessing deep learning model.

Technical Solution

The present disclosure relates to a method for generating a mouth shape by using a deep learning network, and includes the steps of: receiving a face image as an input; generating a mouth shape of the face image into a preset mouth shape by using a first mouth shape generation preprocessing deep learning model; receiving speech information as an input; generating the preset mouth shape into a mouth shape synchronizing with the speech information by using a second mouth shape generation preprocessing deep learning model; and transforming the mouth shape synchronizing with the speech information into a high-definition mouth shape by using a high definition transform postprocessing deep learning model.

The step of generating the mouth shape into the preset mouth shape may include a step of extracting a facial feature vector from the face image, a step of extracting a speech feature vector from speech data with the mouth closed, and a step of combining the facial feature vector and the speech feature vector.

The step of generating the preset mouth shape into the mouth shape synchronizing with the speech information may include a step of extracting a facial feature vector from a face image including the preset mouth shape, a step of extracting a speech feature vector from the speech information, and a step of combining the facial feature vector and the speech feature vector.

The second mouth shape generation preprocessing deep learning model is a deep learning model that beforehand has learned generation of a mouth shape synchronizing with the speech information on a basis of a loss function expressed in an equation below in a learning stage.

[Equation]

$$\text{Mask Loss} = \|\text{Generated Face} \odot \text{Mouth Mask}, \text{Original Face} \odot \text{Mouth Mask}\|_1$$

(Here, Generated Face refers to a face image generated by the second mouth shape generation preprocessing deep learning model, $\odot$ refers to a Hadamard product, and Mouth Mask refers to a mouth mask. Original Face refers to an original image.)

The step of transforming the mouth shape into the high-definition mouth shape may include a step of extracting a facial feature vector from the face image, a step of extracting a facial feature vector from a face image including the mouth shape synchronizing with the speech information, and a step of combining the extracted facial feature vectors.

According to the present disclosure, an apparatus for generating a mouth shape by using a deep learning network includes an image input unit configured to receive a face image as an input, a first mouth shape generation unit configured to generate a mouth shape of the face image into a preset mouth shape by using the first mouth shape generation preprocessing deep learning model, a speech input unit configured to receive speech information as an input, a second mouth shape generation unit configured to generate the preset mouth shape into a mouth shape synchronizing with the speech information by using the second mouth shape generation preprocessing deep learning model, and a high definition transform unit configured to transform the mouth shape synchronizing with the speech information into a high definition mouth shape by using the high definition transform postprocessing deep learning model.

The first mouth shape generation unit may extract the facial feature vector from the face image, may extract the speech feature vector from the speech data with the mouth closed, and may combine the facial feature vector and the speech feature vector.

The second mouth shape generation unit may extract the facial feature vector from the face image including the preset mouth shape, may extract the speech feature vector from the speech information, and may combine the facial feature vector and the speech feature vector.

The second mouth shape generation preprocessing deep learning model may be the deep learning model that prelearns the generation of the mouth shape synchronizing with the speech information on the basis of the above-described loss function in the learning stage.

The high-definition transform unit may extract the facial feature vector from the face image, may extract a facial feature vector from a face image including the mouth shape synchronizing with the speech information, and may combine the extracted facial feature vectors.

Advantageous Effects

According to the present disclosure, a mouth shape generation preprocessing deep learning model is used to transform a mouth shape into a predetermined shape and then perform mouth shape generation, thereby enabling the mouth shape to be generated accurately.

According to the present disclosure, a mouth shape generation post-processing deep learning model is used to transform a low-definition mouth shape into a high-definition mouth shape, thereby enabling high-quality images and videos to be generated.

DESCRIPTION OF THE REFERENCE NUMERALS IN THE DRAWINGS

Figure 1:
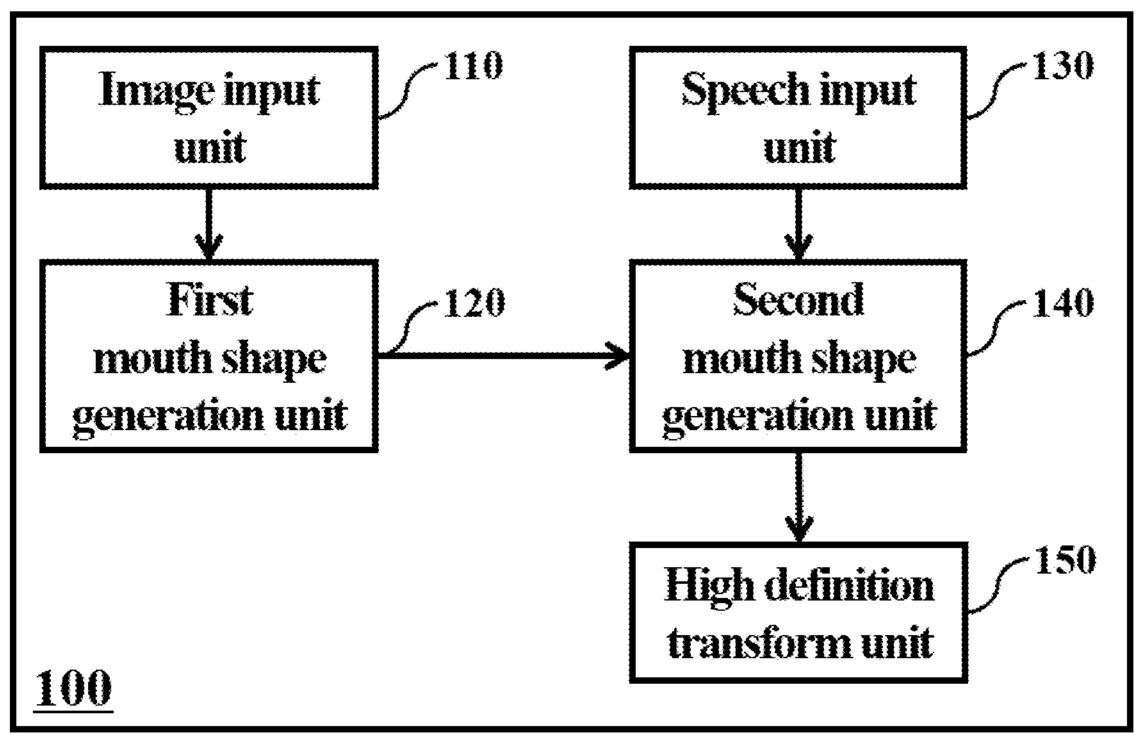
FIG. 1 is a diagram illustrating a mouth shape generation apparatus according to an embodiment of the present disclosure.

100: Mouth shape generation apparatus
110: Image input unit
120: First mouth shape generation unit
130: Speech input unit
140: Second mouth shape generation unit
150: High-definition transform unit

DETAILED DESCRIPTION

Hereinafter, the present disclosure will be described in details. However, the present disclosure is not limited or restricted by exemplary embodiments. The purpose and effect of the present disclosure can be naturally understood or made clearer by the explanation below, but are not limited to the description below. In addition, in explaining the present disclosure, if it is judged that a detailed description of the publicly known technology related to the present disclosure may unnecessarily obscure the gist of the present disclosure, a detailed description thereof will be omitted.

The present disclosure relates to a method and an apparatus for generating a mouth shape that is in sync with speech by using a deep learning network. More specifically, the present disclosure relates to a method and an apparatus for generating a mouth shape that is precisely in sync with speech by using a mouth shape generation preprocessing deep learning model and a high-definition transform post-processing deep learning model.

The mouth shape generation apparatus using a deep learning network can generate a mouth shape synchronizing with speech on the basis of the mouth shape of a person in a face image input into the mouth shape generation apparatus. For example, the mouth shape generation apparatus can generate a mouth shape on the basis of the shape of an open mouth when a person in a face image has the mouth open, and can generate a mouth shape on the basis of the shape of a closed mouth when a person in a face image has the mouth closed. However, the shape of the mouth of a person in a face image ultimately acts as a limiting condition when generating the mouth shape. This is because the result of the mouth shape generation depends on the mouth shape of the person in the face image. Accordingly, an inaccurate mouth shape may be created. According to the present disclosure, after the mouth shape of a person in a face image is transformed to a predetermined shape, a mouth shape that is in sync with speech is generated, so the mouth shape can be accurately generated.

The mouth shape generation apparatus using a deep learning network may learn a mouth shape generation deep learning model by using a mouth shape synchronization discriminator (a deep learning model that discriminates whether a mouth shape is in sync with speech). This is because an environment in which mouth shapes can be intensively learned is provided. However, since the deep learning model is a black box, it is difficult to know what criterion the mouth shape synchronization discriminator uses to discriminate synchronization. Accordingly, it cannot be checked whether the mouth shape generation deep learning model is intensively and accurately learning mouth shapes. According to the present disclosure, in a learning stage, a loss function may be added to induce learning of the mouth shape generation deep learning model (a second mouth shape generation preprocessing deep learning model to be described later), and the mouth shape generation deep learning model can be induced to accurately generate a mouth shape.

Since the mouth shape generation deep learning model uses the mouth shape synchronization discriminator when learning mouth shape generation, the mouth shape generation deep learning model requires a high level of computation and learning stability. Accordingly, the mouth shape generation deep learning model generates a low-definition mouth shape. Since a high-definition mouth shape is not generated, the mouth of the face may be felt to be foreign when compared to other parts of the face. Additionally, specific representations of teeth and oral cavity are also impossible. According to the present disclosure, after generating a mouth shape, post-processing is performed to transform a low-definition mouth shape into a high-definition mouth shape, thereby improving the image definition of the mouth.

Hereinafter, the present disclosure will be described in detail with reference to the accompanying drawings. FIG. 1 is a diagram illustrating the mouth shape generation apparatus according to an embodiment of the present disclosure. Referring to FIG. 1, the mouth shape generation apparatus 100 may include an image input unit 110, a first mouth shape generation unit 120, a speech input unit 130, a second mouth shape generation unit 140, and a high-definition transform unit 150.

The image input unit 110 may receive a face image as an input. The face image includes a frame captured from a video. According to an embodiment of the present disclosure, a user terminal (not shown) may input a face image into the image input unit 110. According to another embodiment of the present disclosure, an image selection unit (not shown) of the mouth shape generation apparatus 100 may select a face image stored in an image storage unit (not shown) of the mouth shape generation apparatus 100 and may input the face image into the image input unit 110. The image input unit 110 may transmit the face image to the first mouth shape generation unit 120.

The first mouth shape generation unit 120 may recognize a mouth shape in the face image and may generate (transform) the recognized mouth shape into a preset mouth shape by using a first mouth shape generation preprocessing deep learning model. The preset mouth shape may be the shape of the mouth when the mouth is closed (hereinafter, referred to as "a preset mouth shape" or "a first mouth shape"). The first mouth shape generation unit 120 may transmit the face image including the first mouth shape to the second mouth shape generation unit 140.

According to an embodiment of the present disclosure, the first mouth shape may be the shape of the mouth when uttering "mmm~~" with the mouth closed (hereinafter, "mmm~~" may be referred to as "BMP"). According to another embodiment of the present disclosure, the first mouth shape may be the shape of the mouth when the mouth is closed but no sound is produced (i.e. silent). The first mouth shape is not limited to the above-described embodiments, and any mouth shape which corresponds to the shape of the mouth when the mouth is closed may be used as the first mouth shape.

The first mouth shape generation unit 120 generates the mouth shape of a person in a face image as the preset mouth shape, so the (initial) mouth shape of the person in the face image may not act as a limiting condition of the second mouth shape generation unit 140 or the second mouth shape generation preprocessing deep learning model. When the first mouth shape generation unit 120 recognizes the mouth shape of a person in a face image as the first mouth shape, the first mouth shape generation unit 120 may not perform generating the first mouth shape.

The speech input unit 130 may receive speech data to synchronize with a mouth shape. According to an embodiment of the present disclosure, a user terminal (not shown) may input speech data into the speech input unit 130. According to another embodiment of the present disclosure, a speech selection unit (not shown) of the mouth shape generation apparatus 100 may select speech data stored in a speech storage unit (not shown) of the mouth shape generation apparatus 100 and may input the speech data into the speech input unit 130. The speech input unit 130 may transmit the speech data to the second mouth shape generation unit 140.

The second mouth shape generation unit 140 may generate a mouth shape which is in sync with speech data by using the second mouth shape generation preprocessing deep learning model (hereinafter, "a mouth shape that is in sync with speech data" is referred to as "a second mouth shape"). The second mouth shape generated by the second mouth shape generation unit 140 may be of low definition. A low definition second mouth shape refers to the approximate shape of the mouth, and the configuration of the inside of the mouth, such as the shape of the lips, teeth, and an oral structure, may not be clear. The second mouth shape generation unit 140 may transmit a face image including the low definition second mouth shape to the high-definition transform unit 150.

The high-definition transform unit 150 can transform the low definition second mouth shape into a high definition second mouth shape by using the high-definition transform postprocessing deep learning model. The high-definition transform unit 150 may transform the shape of the mouth (lips) to be clear and may transform the configuration of the inside of the mouth, such as teeth and an oral structure, to be clear. The high-definition transform unit 150 may transmit a face image including the high definition second mouth shape to an image output unit (not shown).

Figure 2:
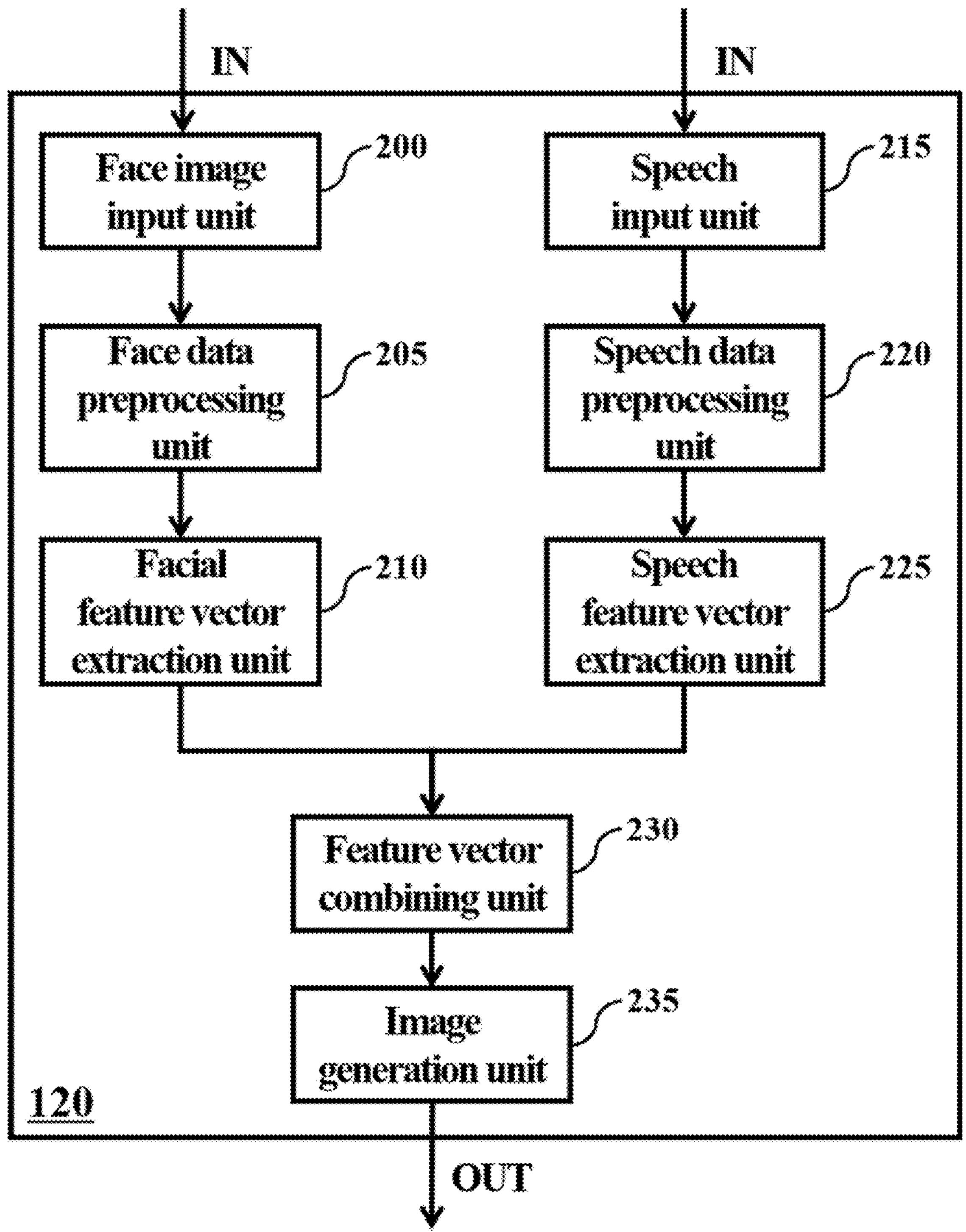
FIG. 2 is a diagram illustrating a deep learning model of a first mouth shape generation unit according to an embodiment of the present disclosure.

FIG. 2 is a diagram illustrating the deep learning model of the first mouth shape generation unit according to an embodiment of the present disclosure. Referring to FIG. 2, the first mouth shape generation unit 120 may include a face image input unit 200, a face data preprocessing unit 205, a facial feature vector extraction unit 210, a speech input unit 215, a speech data preprocessing unit 220, a speech feature vector extraction unit 225, a feature vector combining unit 230, and an image generation unit 235.

The face image input unit 200 may receive a face image from the image input unit 110 and may transmit the face image to the face data preprocessing unit 205.

The face data preprocessing unit 205 may perform data preprocessing on a face image. The face data preprocessing unit 205 may preprocess at least one of the face area, position, color, and brightness of the face image to facilitate the detection of feature points. The face data preprocessing unit 205 may perform the size alignment of the face image and align the size of the face image to be a preset size. The face data preprocessing unit 205 may transmit the preprocessed face image to the facial feature vector extraction unit 210.

The facial feature vector extraction unit 210 may extract a feature vector from the preprocessed face image. The facial feature vector extraction unit 210 may detect the positions of one or more of the eyes, nose, mouth, and ear in the preprocessed face image, preset the positions as feature points, and extract a feature vector by connecting the coordinate values of the feature points. According to an embodiment of the present disclosure, when a person speaks, not only the mouth (lips) move, but also the chin moves, so an image of the entire face is required, and it is preferable to extract feature vectors for the entire face.

According to the embodiment of the present disclosure, the end points of both eyes, the middle of the pupil, the ends of both eyebrows, the middle of the nose, the opposite ends of the mouth, the upper and lower ends of the ears, the opposite ends of the chin, and the bottom of the chin, etc. may be preset as feature points. The first mouth shape generation preprocessing deep learning model may be a deep learning model that has learned the preset feature points in advance, and may accurately extract facial feature vectors through learning of the preset feature points. The facial feature vector extraction unit 210 may transmit the facial feature vectors to the feature vector combining unit 230.

The speech input unit 215 can receive data of speech that can be uttered with the mouth closed. According to an embodiment of the present disclosure, a user terminal (not shown) may input speech data into the speech input unit 215. According to another embodiment of the present disclosure, the speech selection unit (not shown) of the first mouth shape generation unit 120 may select speech data stored in the speech storage unit (not shown) of the first mouth shape generation unit 120 and may input the speech data into the speech input unit 215.

According to an embodiment of the present disclosure, the speech data may be BMP speech data, or may be silent data. Here, the silent data refers to data that can be played as voice data, but no speech is output during playback time. Speech data are not limited to the above-described embodiments, and any speech data that can be uttered with the mouth closed may be used as speech data. The speech input unit 215 may transmit speech data to the speech data preprocessing unit 220.

The speech data preprocessing unit 220 may perform preprocessing such as adjusting the playback time of the speech data and removing noise other than speech. The speech data preprocessing may be performed for the purpose of generating a Mel spectrogram. Speech may basically be said to be a wave composed of amplitude and time. By using a short-time Fourier transform (STFT) technique, which converts speech data into frequency and amplitude data for a short period of time, the speech data may be converted into a two-dimensional image according to time.

In general, people cannot hear speech at too high a frequency, but recognize low-frequency speech better than high-frequency speech. According to an embodiment of the present disclosure, high-frequency information may be removed by using a filter, and information contained in speech data may be reduced to a required level by converting time-dependent wave information into frequency information according to a window size for Fourier transform. The speech data preprocessing unit 220 may transmit the preprocessed speech data to the speech feature vector extraction unit 225.

The speech feature vector extraction unit 225 may extract a feature vector from the preprocessed speech data. The speech feature vector extraction unit 225 may be composed of a convolution neural network (CNN). A speech feature vector may be extracted as the preprocessed speech data, that is, a speech image, passes through the convolution neural network (CNN). The speech feature vector extraction unit 225 may transmit the speech feature vector to the feature vector combining unit 230.

The feature vector combining unit 230 can combine a facial feature vector extracted and transmitted by the facial feature vector extraction unit 210 and a speech feature vector extracted and transmitted by the speech feature vector extraction unit 225. The feature vector combining unit 230 may transmit the combined feature vectors to the image generation unit 235.

The image generation unit 235 may generate and output a face image including the first mouth shape on the basis of the combined feature vectors. The image generation unit 235 may transmit the face image including the first mouth shape, that is, a face image with a closed mouth, to the second mouth shape generation unit 140.

Figure 3:
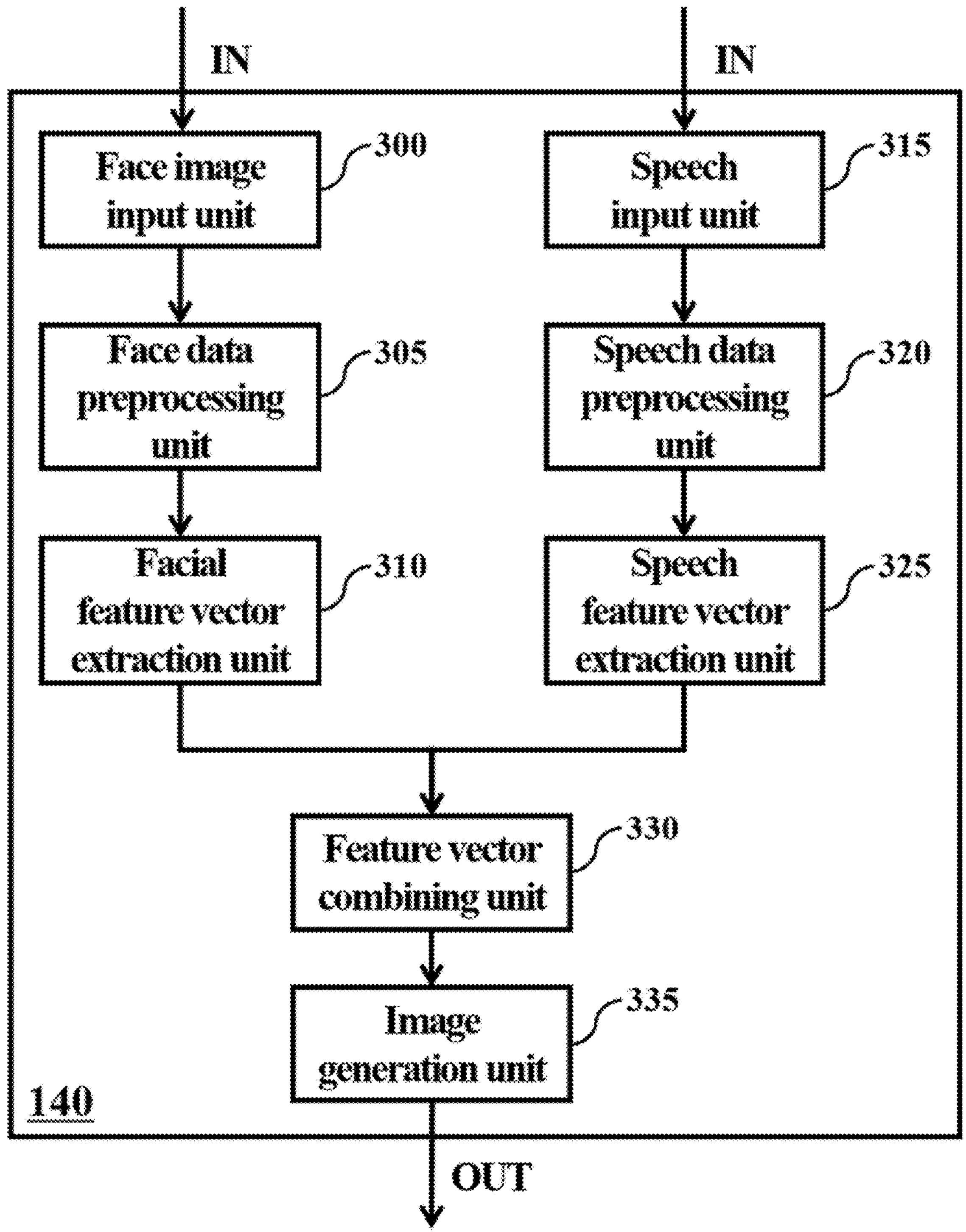
FIG. 3 is a diagram illustrating a deep learning model of a second mouth shape generation unit according to an embodiment of the present disclosure.

FIG. 3 is a diagram illustrating the deep learning model of the second mouth shape generation unit according to an embodiment of the present disclosure. Referring to FIG. 3, the second mouth shape generation unit 140 may include a face image input unit 300, a face data preprocessing unit 305, a facial feature vector extraction unit 310, a speech input unit 315, a speech data preprocessing unit 320, a speech feature vector extraction unit 325, a feature vector combining unit 330, and an image generation unit 335.

The face image input unit 300 may receive a face image including the first mouth shape from the first mouth shape generation unit 120, and may transmit the face image including the first mouth shape to the face data preprocessing unit 305.

The face data preprocessing unit 305 may perform data preprocessing on a face image including the first mouth shape. The face data preprocessing unit 305 may preprocess at least one of the area, position, color, and brightness of the face and first mouth shape to facilitate the detection of feature points. The face data preprocessing unit 305 can perform the size alignment of the face image and align the size of the face image to be a preset size. The face data preprocessing unit 305 may transmit the face image including the preprocessed first mouth shape to the facial feature vector extraction unit 310.

The facial feature vector extraction unit 310 may extract the facial feature vector from the face image including the preprocessed first mouth shape. The facial feature vector extraction unit 310 may detect the positions of one or more of the eyes, nose, mouth, and ear in the face image including the preprocessed first mouth shape, preset the positions as feature points, and extract a feature vector by connecting the coordinate values of the feature points. According to an embodiment of the present disclosure, it is preferable to extract feature vectors for the entire face.

According to an embodiment of the present disclosure, the end points of both eyes, the middle of the pupil, the ends of both eyebrows, the middle of the nose, the opposite ends of the mouth, the upper and lower ends of the ears, the opposite ends of the chin, and the bottom of the chin, etc. may be preset as feature points. The second mouth shape generation preprocessing deep learning model may be a deep learning model that has learned the preset feature points in advance, and can accurately extract facial feature vectors through learning of the preset feature points. The facial feature vector extraction unit 310 may transmit the facial feature vectors to the feature vector combining unit 330.

The speech input unit 315 may receive speech data to synchronize with a mouth shape from the speech input unit 130. The speech input unit 315 may transmit the speech data to the speech data preprocessing unit 320.

The speech data preprocessing unit 320 may perform preprocessing on the speech data. The speech data preprocessing unit 320 may perform preprocessing such as adjusting the playback time of the speech data and removing noise other than speech. The speech data preprocessing may be performed for the purpose of generating a Mel spectrogram. As described above, by using a short-time Fourier transform (STFT) technique, the speech data may be converted into a two-dimensional image according to time.

According to an embodiment of the present disclosure, high-frequency information may be removed by using a filter, and information contained in speech data may be reduced to a required level by converting time-dependent wave information into frequency information according to a window size for Fourier transform. The speech data preprocessing unit 320 may transmit the preprocessed speech data to the speech feature vector extraction unit 325.

The speech feature vector extraction unit 325 may extract a speech feature vector from the preprocessed speech data, that is, a speech image. The speech feature vector extraction unit 325 may be composed of a convolution neural network (CNN), and may extract the speech feature vector through the convolution neural network (CNN). The speech feature vector extraction unit 325 may transmit the speech feature vector to the feature vector combining unit 330.

The feature vector combining unit 330 may combine the facial feature vector extracted and transmitted by the facial feature vector extraction unit 310 and the speech feature vector extracted and transmitted by the speech feature vector extraction unit 325. The feature vector combining unit 330 may transmit the combined feature vectors to the image generation unit 325.

The image generation unit 325 may generate and output a face image including a mouth shape that is in sync with speech during speech playback time, that is, the second mouth shape, on the basis of the combined feature vectors. The image generated and output by the image generation unit 325 may be a face image including the low definition second mouth shape.

Figure 4:
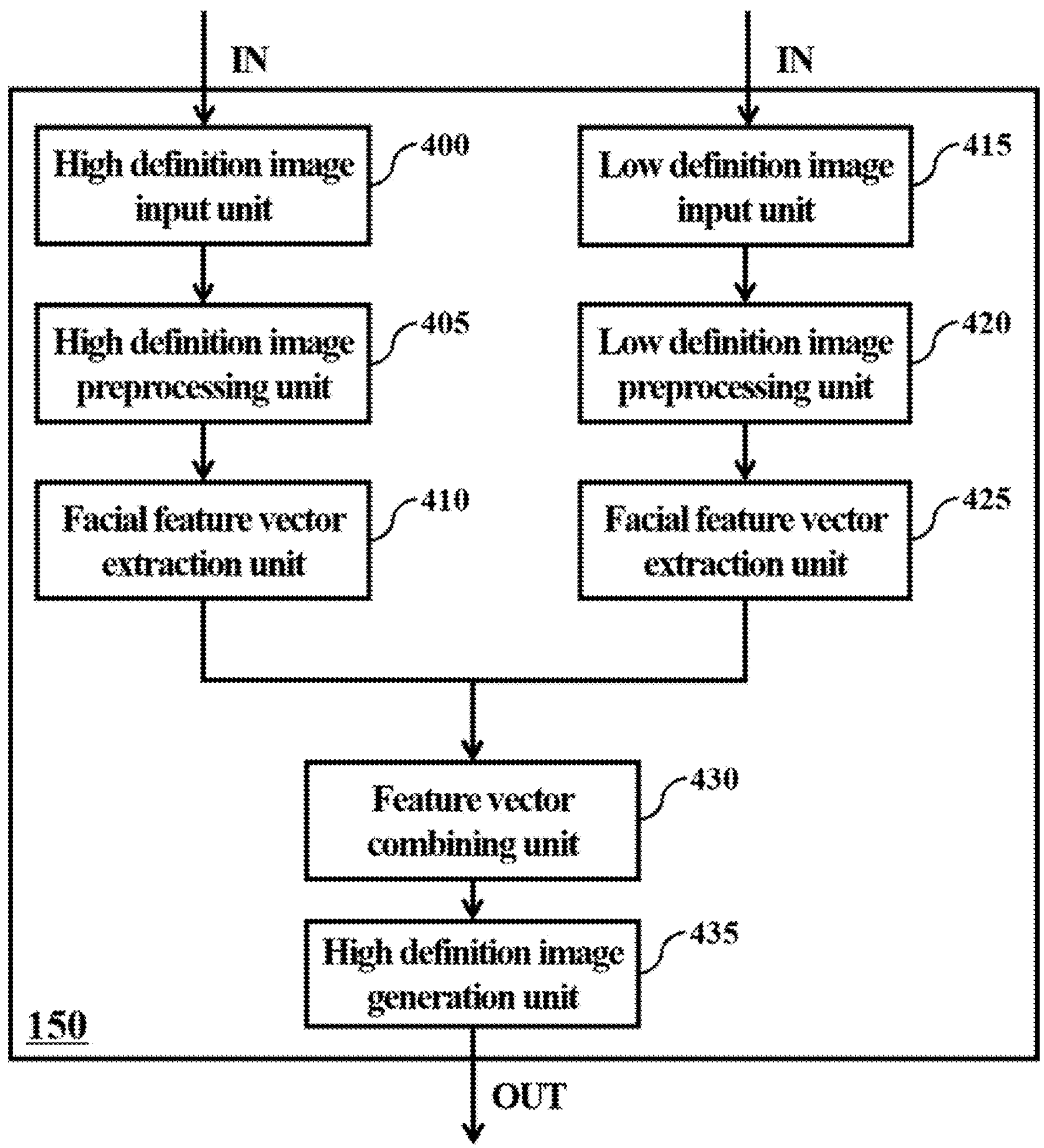
FIG. 4 is a diagram illustrating a deep learning model of a high-definition transform unit according to an embodiment of the present disclosure.

FIG. 4 is a diagram illustrating the deep learning model of the high-definition transform unit according to an embodiment of the present disclosure. Referring to FIG. 4, the high-definition transform unit 150 may include a high-definition image input unit 400, a high-definition image preprocessing unit 405, a facial feature vector extraction unit 410, a low-definition image input unit 415, a low-definition image preprocessing unit 420, a facial feature vector extraction unit 425, a feature vector combining unit 430, and a high-definition image generation unit 435.

The high-definition image input unit 400 may receive a high-definition face image as an input. Here, the high-definition face image may mean a high-definition image of a face image received by the image input unit 110, or may mean a corresponding face image received by the image input unit 110 in a case in which the face image received by the image input unit 110 is a high-definition face image.

According to an embodiment of the present disclosure, a user terminal (not shown) may input the high-definition face image into the high-definition image input unit 410. According to another embodiment of the present disclosure, a high-definition image selection unit (not shown) of the high-definition transform unit 150 may select the high-definition face image stored in a high-definition image storage unit (not shown) of the high-definition transform unit 150 and may input the high-definition face image into the high-definition image input unit 400. The high-definition image input unit 400 may transmit the high-definition face image to the high-definition image preprocessing unit 405.

The high-definition image preprocessing unit 405 may perform data preprocessing on the high-definition face image. The high-definition image preprocessing unit 405 may preprocess at least one of the facial area, position, color, and brightness of the face image to facilitate the detection of feature points. The high-definition image preprocessing unit 405 may perform size alignment of the face image and align the size of the face image to be a preset size. The high-definition image preprocessing unit 405 may transmit the preprocessed high-definition face image to the facial feature vector extraction unit 410.

The facial feature vector extraction unit 410 may extract a facial feature vector from the preprocessed high-definition face image. The facial feature vector extraction unit 410 may detect the positions of one or more of the eyes, nose, mouth, and ears in the preprocessed high-definition face image, preset the positions as feature points, and then extract a feature vector by connecting the coordinate values of the feature points. According to an embodiment of the present disclosure, it is preferable to extract feature vectors for the entire face.

According to an embodiment of the present disclosure, the end points of both eyes, the middle of the pupil, the ends of both eyebrows, the middle of the nose, the opposite ends of the mouth, the upper and lower ends of the ears, the opposite ends of the chin, and the lower end of the chin may be preset as feature points. The high-definition transform postprocessing deep learning model may be a deep learning model that has learned the preset feature points in advance, and may accurately extract facial feature vectors through the learning of the preset feature points. The facial feature vector extraction unit 410 may transmit the facial feature vectors to the feature vector combining unit 430.

The low-definition image input unit 415 may receive a face image including the low definition second mouth shape from the second mouth shape generation unit 140, and may transmit the face image including the low definition second mouth shape to the low-definition image preprocessing unit 420.

The low-definition image preprocessing unit 420 may perform data preprocessing on a face image including the low definition second mouth shape. The low-definition image preprocessing unit may preprocess at least one of the area, position, color, and brightness of the face and second mouth shape to facilitate the detection of feature points. The low-definition image preprocessing unit 420 may perform the size alignment of the face image and align the size of the face image to be a preset size. The low-definition image preprocessing unit 405 may transmit the face image including the preprocessed low definition second mouth shape to the facial feature vector extraction unit 425.

The facial feature vector extraction unit 425 may extract a facial feature vector from the face image including the preprocessed low definition second mouth shape. The facial feature vector extraction unit 425 may detect the positions of one or more of the eyes, nose, mouth, and ears in the face image including the preprocessed low definition second mouth shape, preset the positions as feature points, and then extract a feature vector by connecting the coordinate values of the feature points. According to an embodiment of the present disclosure, it is preferable to extract feature vectors for the entire face.

According to an embodiment of the present disclosure, the end points of both eyes, the middle of the pupil, the ends of both eyebrows, the middle of the nose, the opposite ends of the mouth, the upper and lower ends of the ears, the ends of the chin, and the lower end of the chin may be preset as feature points. As described above, the high-definition transform postprocessing deep learning model may be a deep learning model that has learned the preset feature points in advance, and may accurately extract facial feature vectors through the learning of the present feature points. The facial feature vector extraction unit 425 may transmit the facial feature vectors to the feature vector combining unit 430.

The feature vector combining unit 430 may combine the facial feature vector extracted and transmitted by the facial feature vector extraction unit 410 and the facial feature vector extracted and transmitted by the facial feature vector extraction unit 425. The feature vector combining unit 430 may transmit the combined feature vectors to the high-definition image generation unit 435.

The high-definition image generation unit 435 may generate a face image including a high definition second mouth shape on the basis of the combined feature vectors. According to an embodiment of the present disclosure, the high-definition image generation unit 435 may transmit the face image including the high definition second mouth shape to the image output unit (not shown) of the mouth shape generation apparatus 100, and the image output unit (not shown) may output the face image including the high definition second mouth shape. According to another embodiment of the present disclosure, the high-definition image generation unit 435 may transmit the face image including the high definition second mouth shape to a user terminal (not shown), and the user terminal (not shown) may output the face image including the high definition second mouth shape. Meanwhile, the high-definition image generation unit 435 may transmit the face image including the high definition second mouth shape to a result storage unit (not shown) of the mouth shape generation apparatus 100, and the result storage unit (not shown) may store the face image including the high definition second mouth shape.

Figure 5:
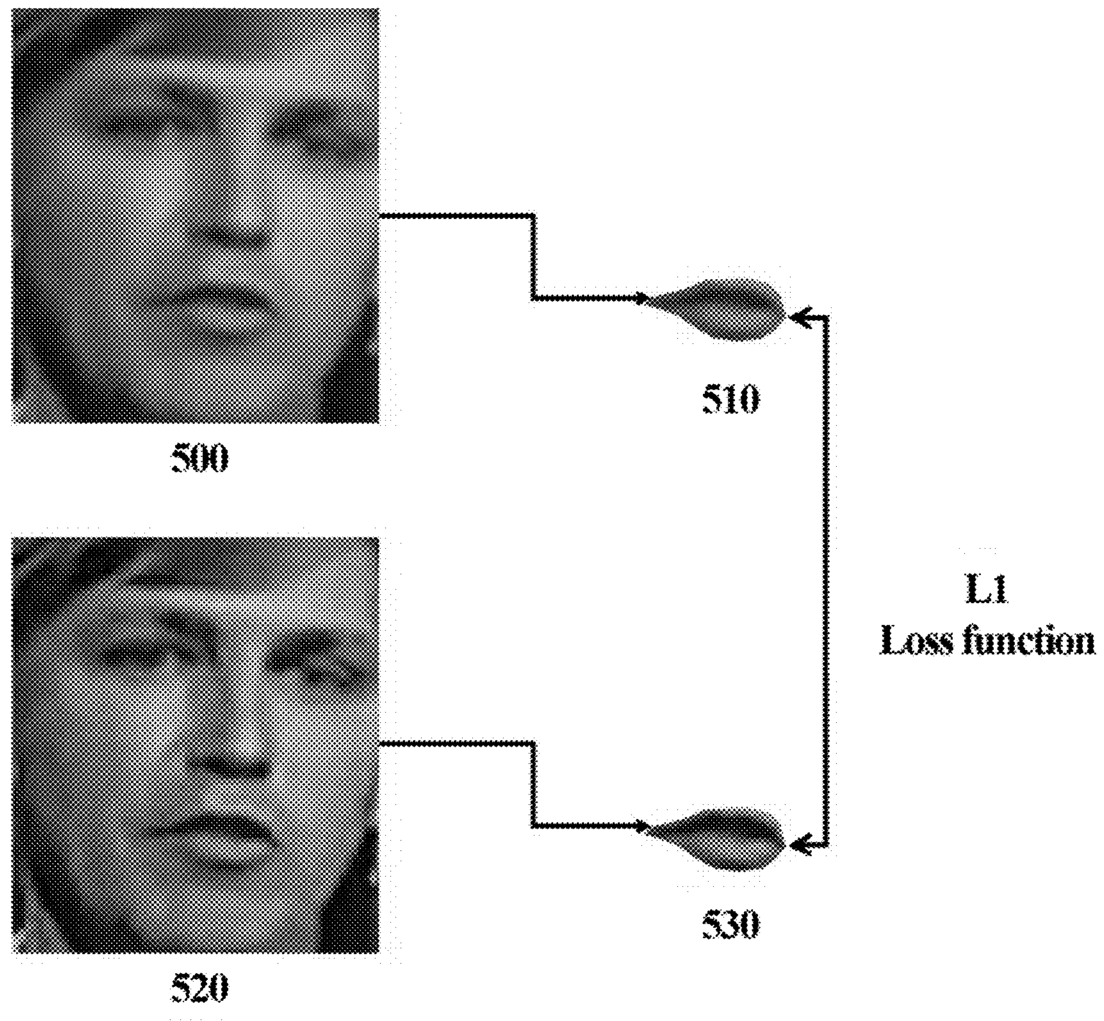
FIG. 5 is a diagram illustrating a mouth shape generation learning method according to an embodiment of the present disclosure.

FIG. 5 is a diagram illustrating a mouth shape generation learning method according to an embodiment of the present disclosure. The mouth shape generation learning method explained through FIG. 5 is a method that utilizes a mouth (lip) mask (a segmentation mask), and mouth shape creation refers to the creation of a second mouth shape. A mouth mask is a mask image in which a mouth part is white and a part around the mouth is black, and the mouth part may be extracted through the mouth mask.

Referring to FIG. 5, an image 500 generated by the second mouth shape generation preprocessing deep learning model and the mouth (lip) mask are multiplied by Hadamard product to output a multiplication value 510, and after multiplying a correct answer (original) image 520 and the lip mask by Hadamard product and outputting a multiplication value 530, similarity between the two multiplication operation values 510 and 530 may be calculated by an L1 loss function. The second mouth shape generation preprocessing deep learning model may be induced to intensively learn the generation of the second mouth shape by using the mouth mask to learn the generation of the second mouth shape in advance in the learning stage.

$$\text{Mask Loss}=\|\text{Generated Face}\odot\text{Mouth Mask},\text{Original Face}\odot\text{Mouth Mask}\|_1$$ [L1 loss function](an equation described above)

Figure 6:
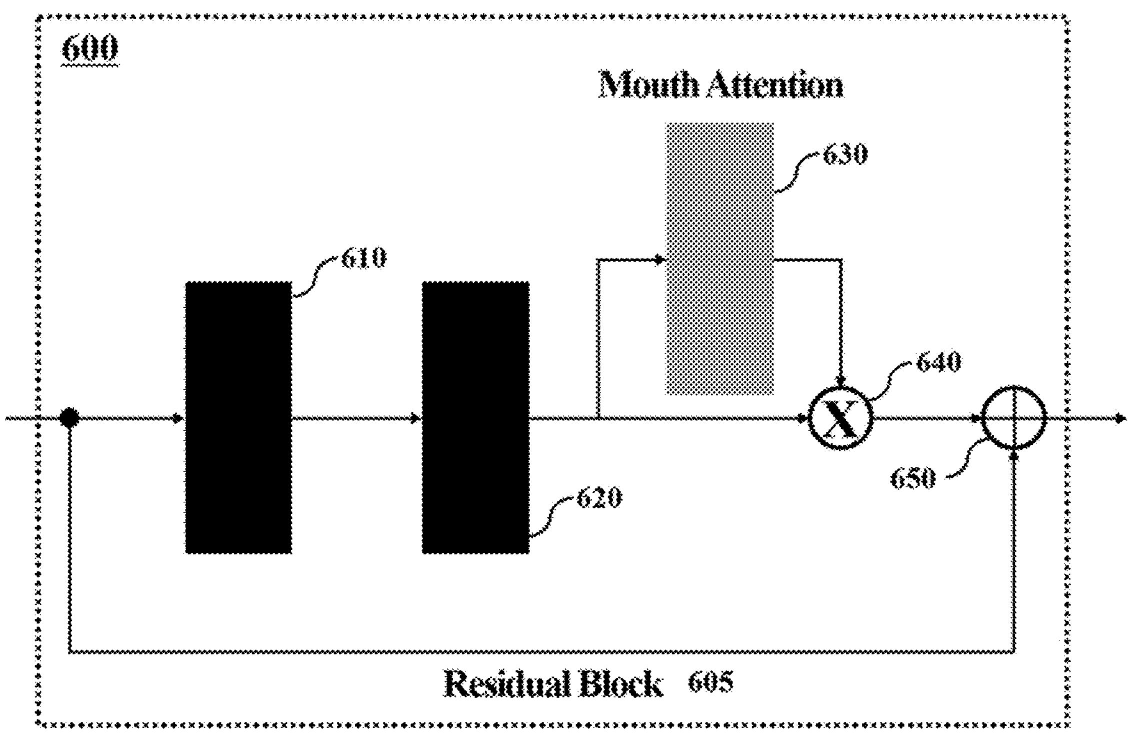
FIG. 6 is a diagram illustrating a mouth shape attention block according to an embodiment of the present disclosure.

FIG. 6 is a diagram illustrating a mouth shape attention block according to an embodiment of the present disclosure. The mouth shape attention block of FIG. 6 may be used in the learning stage of the mouth shape generation deep learning model. Referring to FIG. 6, the mouth shape attention block 600 may include a residual block 605, a first convolution layer 610, a second convolution layer 620, and a mouth shape attention unit 630, a multiplication operation unit 640, and an addition operation unit 650.

A face image may be input into the mouth shape attention block 600. An output calculated by passing the face image through the first convolution layer 610 and the second convolution layer 620 and an output calculated by passing the face image through the first convolution layer 610, the second convolution layer 620, and the mouth shape attention unit 630 may be multiplied to each other in the multiplication operation unit 540. Through the multiplication operation, only information about a mouth shape may be left among information about the entire face. An output calculated by passing the face image through the residual block 605 and an output of the above-described multiplication operation may be added to each other in the addition operation unit 650. Through the addition operation, weight may be given to information about the mouth shape among information about the entire face. In the mouth shape attention block 600, weight is given to a mouth shape, specifically, to pixels of a mouth part in a feature map from each layer of the mouth shape generation deep learning model (a convolution neural network) so that the mouth shape generation deep learning model can focus on learning mouth shape generation.

The high-definition transform postprocessing deep learning model may also focus on learning about the mouth part by using the mouth shape attention block 600. When learning about the mouth part, the high-definition transform postprocessing deep learning model performs the learning after setting the learned parameters of the mouth shape attention block 600 as initial parameters, enabling more accurate and faster learning. The structure of the high-definition transform postprocessing deep learning model may be a structure in which several layers of residual blocks are stacked, and may improve a performance thereof by adding the mouth shape attention block 600 to each residual block.

A face and mouth shape image data learning method is basically performed, based on a supervised learning, through the classification of distinguishing background and each part and color of the face, and the regression generation of predicting vectors. On the other hand, the face and mouth shape image data learning method may be performed through clustering based on unsupervised learning.

As the mouth shape generation deep learning model, a convolution neural network (CNN), a generative adversarial network (GAN), and a support vector machine (SVM), etc. may be used as algorithms. However, the algorithms are not limited thereto, and various deep learning algorithms may be applied.

Figure 7:
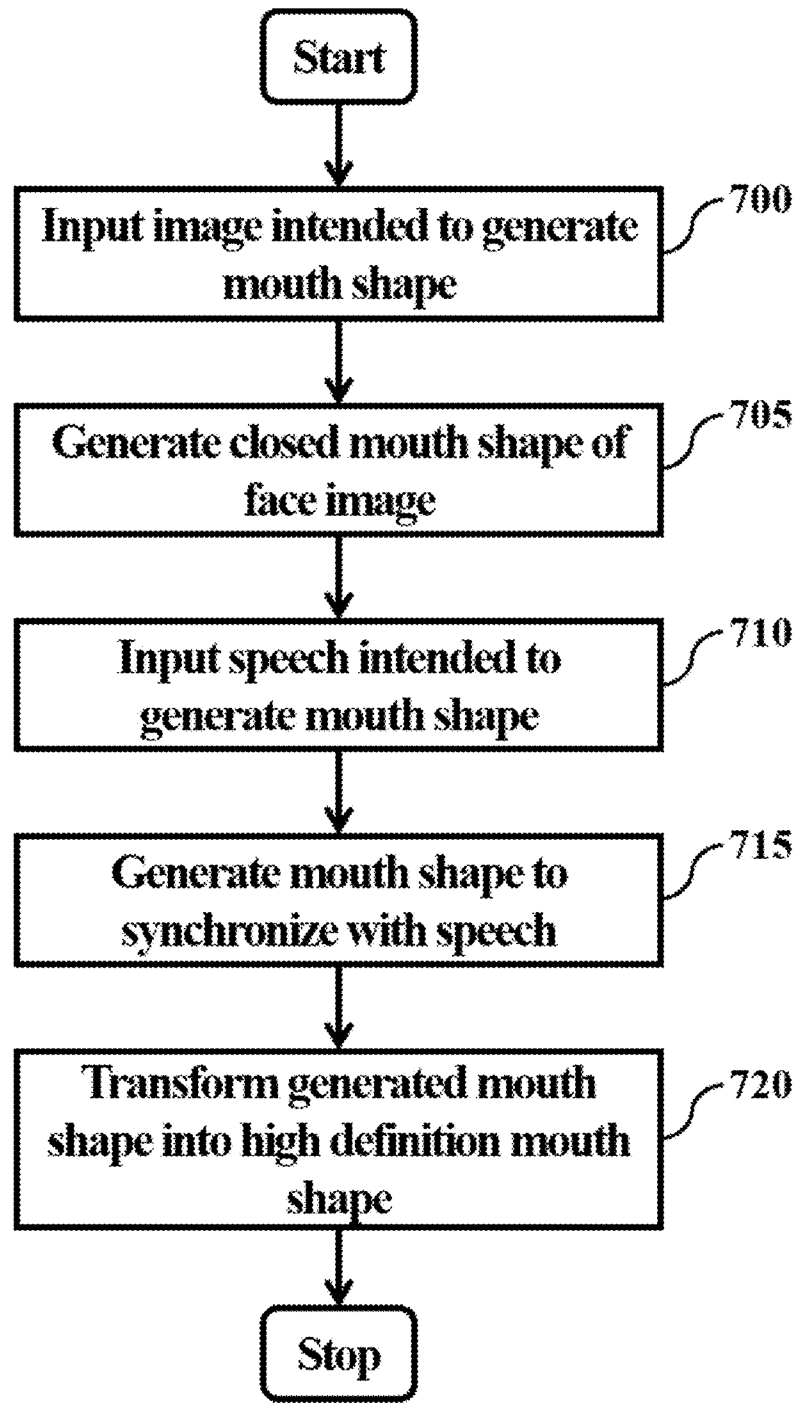
FIG. 7 is a flowchart illustrating a mouth shape generation method according to an embodiment of the present disclosure.

FIG. 7 is a flowchart illustrating a mouth shape generation method according to an embodiment of the present disclosure. Hereinafter, the mouth shape generation method will be described with reference to FIG. 7.

At step 700, the image input unit 110 may receive a face image for the purpose of converting a mouth shape. The image input unit 110 may transmit the face image to the first mouth shape generation unit 120.

At step 705, the first mouth shape generation unit 120 may generate the mouth shape of the face image into the first mouth shape by using the first mouth shape generation preprocessing deep learning model. The first mouth shape generation unit 120 may transmit the face image including the first mouth shape to the second mouth shape generation unit 140.

At step 710, the speech input unit 130 may receive speech data to synchronize with the mouth shape, and the speech input unit 130 may transmit the speech data to the second mouth shape generation unit 140.

At step 715, by using the second mouth shape generation preprocessing deep learning model, the second mouth shape generation unit 140 may generate the first mouth shape of the face image into a mouth shape synchronizing with speech, that is, a second mouth shape on the basis of the speech data. The second mouth shape generation unit 140 may transmit the face image including the low definition second mouth shape to the high-definition transform unit 150.

At step 720, by using the high-definition transform postprocessing deep learning model, the high definition transform unit 150 may transform the low-definition second mouth shape into the high definition second mouth shape.

According to the method for generating a mouth shape by using a deep learning network according to the embodiment of the present disclosure, the first mouth shape generation preprocessing deep learning model may be used to transform the mouth shape of the face image into the first mouth shape so that the accuracy of the mouth shape can be increased, and the high definition transform postprocessing deep learning model may be used to transform the low definition second mouth shape into the high definition second mouth shape so that higher quality images can be generated. By grouping the face image including the high definition second mouth shape, the mouth shape changes depending on speech, and a video with accurate synchronization between the voice and mouth shape may be generated.

Meanwhile, the apparatus and method for generating the mouth shape of the present disclosure can be implemented by a computer-readable code on a computer-readable recording medium. The computer-readable recording medium includes all types of recording devices that store data that can be read by a computer system. Examples of the computer-readable recording media include ROM, RAM, CD-ROM, a magnetic tape, a floppy disk, and an optical data storage device, etc. In addition, the computer-readable recording media are distributed across networked computer systems so that computer-readable codes can be stored and executed in a distributed manner. In addition, functional programs, codes, and code segments for implementing the present disclosure can be easily deduced by programmers in the technical field to which the present disclosure belongs.

Although the present disclosure has been described in detail through the exemplary embodiments above, it will be appreciated that those skilled in the art in the technical field to which the present disclosure pertains can variously modify the above-described embodiments without deviating from the scope of the present disclosure. Therefore, the scope of the present disclosure should not be limited to the described embodiments, but should be determined not only by the claims to be described later, but also by all changes or modified forms derived from the concept equivalent to the claims.

The invention claimed is:

1. A method for generating a mouth shape by using a deep learning network, the method comprising:

(a) a step at which an image input unit receives a face image as an input;

(b) a step at which by using a first mouth shape generation preprocessing deep learning model, a first mouth shape generation unit extracts a facial feature vector for an entire face from the face image, extracts a speech feature vector from data of speech uttered with a mouth closed, and combines the facial feature vector and the speech feature vector to transform a mouth shape of the face image into a mouth shape with the mouth closed;

(c) a step at which a speech input unit receives speech information as an input;

(d) a step at which a second mouth shape generation unit generates the mouth shape with the mouth closed into a mouth shape synchronizing with the speech information by using a second mouth shape generation preprocessing deep learning model; and (e) a step at which the high-definition transform unit transforms the mouth shape synchronizing with the speech information into a high-definition mouth shape by using a high-definition transform postprocessing deep learning model;

wherein the step (d) comprises:

(d1) a step of extracting a facial feature vector for an entire face from a face image having the mouth shape when the mouth is closed;

(d2) a step of extracting a speech feature vector from the speech information; and (d3) a step of combining the facial feature vector and the speech feature vector;

wherein the second mouth shape generation preprocessing deep learning model is a deep learning model that beforehand has learned the generation of the mouth shape synchronizing with the speech information on a basis of a loss function in a learning stage;

wherein the loss function is to calculate a similarity between a first multiplication operation value and a second multiplication value;

wherein the first multiplication operation value is a result of a face image generated by the second mouth shape generation preprocessing deep learning model multiplying a mouth mask of the mouth by a Hadamard product;

wherein the second multiplication operation value is a result of the input face image multiplying the mouth mask by a Hadamard product;

wherein the loss function is expressed as:

$$\text{Mask Loss}=\|\text{Generated Face}\odot\text{Mouth Mask},\text{Original Face}\odot\text{Mouth Mask}\|_1;$$

wherein Generated Face refers to the face image generated by the second mouth shape generation preprocessing deep learning model, ⊙ refers to a Hadamard product, Mouth Mask refers to the mouth mask, and Original Face refers to the input face image.

2. The method of claim 1, wherein the step (e) comprises:

(e1) a step of extracting a facial feature vector for an entire face from a high-definition face image of the face image input from the step (a);

(e2) a step of extracting a facial feature vector for an entire face from a face image having the mouth shape synchronizing with the speech information; and (e3) a step of combining the extracted facial feature vectors.

3. An apparatus for generating a mouth shape by using a deep learning network, the apparatus comprising:

an image input unit configured to receive a face image as an input;

a first mouth shape generation unit configured to extract a facial feature vector for an entire face from the face image, to extract a speech feature vector from data of speech uttered with a mouth closed, and to combine the facial feature vector and the speech feature vector to transform a mouth shape of the face image into a mouth shape with the mouth closed by using a first mouth shape generation preprocessing deep learning model;

a speech input unit configured to receive speech information as an input;

a second mouth shape generation unit configured to generate the mouth shape with the mouth closed into a mouth shape synchronizing with the speech information by using a second mouth shape generation preprocessing deep learning model; and a high-definition transform unit configured to transform the mouth shape synchronizing with the speech information into a high-definition mouth shape by using a high-definition transform postprocessing deep learning model;

wherein the second mouth shape generation unit extracts a facial feature vector for an entire face from a face image having the mouth shape when the mouth is closed, extracts a speech feature vector from the speech information, and combines the facial feature vector and the speech feature vector;

wherein the second mouth shape generation preprocessing deep learning model is a deep learning model that beforehand has learned the generation of the mouth shape synchronizing with the speech information on a basis of a loss function in a learning stage;

wherein the loss function is to calculate a similarity between a first multiplication operation value and a second multiplication value;

wherein the first multiplication operation value is a result of a face image generated by the second mouth shape generation preprocessing deep learning model multiplying a mouth mask of the mouth by a Hadamard product;

wherein the second multiplication operation value is a result of the input face image multiplying the mouth mask by a Hadamard product;

wherein the loss function is expressed as:

$$\text{Mask Loss} = \|\text{Generated Face} \odot \text{Mouth Mask}, \text{Original Face} \odot \text{Mouth Mask}\|_1;$$

wherein Generated Face refers to the face image generated by the second mouth shape generation preprocessing deep learning model, $\odot$ refers to a Hadamard product, Mouth Mask refers to the mouth mask, and Original Face refers to the input face image.

4. The apparatus of claim 3, wherein the high-definition transform unit extracts a facial feature vector for an entire face from a high-definition face image of the face image received by the image input unit, extracts a facial feature vector for an entire face from a face image having the mouth shape synchronizing with the speech information, and combines the extracted facial feature vectors.

* * * * *